United States Patent [19]
Juergens

[11] Patent Number: 5,403,250
[45] Date of Patent: Apr. 4, 1995

[54] ARRANGEMENT FOR ADJUSTING THE CLUTCH SLIP OF A FRICTION CLUTCH ARRANGED ON THE OUTPUT SIDE OF A MOTOR VEHICLE ENGINE

[75] Inventor: Gunter Juergens, Baden-Baden, Germany

[73] Assignee: Mercedes-Benz AG, Stuttgart, Germany

[21] Appl. No.: 200,991

[22] Filed: Dec. 13, 1993

[30] Foreign Application Priority Data

Dec. 12, 1992 [DE] Germany .................. 42 41 995.6

[51] Int. Cl.[6] ............................................. F16D 43/22
[52] U.S. Cl. ................................... 477/176; 477/174; 477/180
[58] Field of Search ............... 477/169, 174, 175, 176, 477/180

[56] References Cited

U.S. PATENT DOCUMENTS 4,588,772 12/1985 Grimes et al. .
4,660,697 4/1987 Yoneda et al. .................. 477/175
4,724,939 2/1988 Lockhart et al. .
5,322,150 6/1994 Schmidt-Brücken et al. ..... 477/175 X

FOREIGN PATENT DOCUMENTS 0494608 7/1992 European Pat. Off. .
3130871C2 9/1988 Germany .
3918254A1 12/1989 Germany .
4100372A1 7/1992 Germany .
2119050 11/1983 United Kingdom .
2164398 3/1986 United Kingdom .

Primary Examiner—Charles A. Marmor
Assistant Examiner—Peter Kwon
Attorney, Agent, or Firm—Evenson, McKeown, Edwards & Lenahan

[57] ABSTRACT

In an arrangement for adjusting the clutch slip of a friction clutch arranged on the output side of an engine of a motor vehicle, a control variable, formed as a function of the operating point of the engine and of an associated set point value for the clutch slip read out of a characteristic diagram, is applied directly to a clutch control element which adjusts the clutch slip.

7 Claims, 1 Drawing Sheet

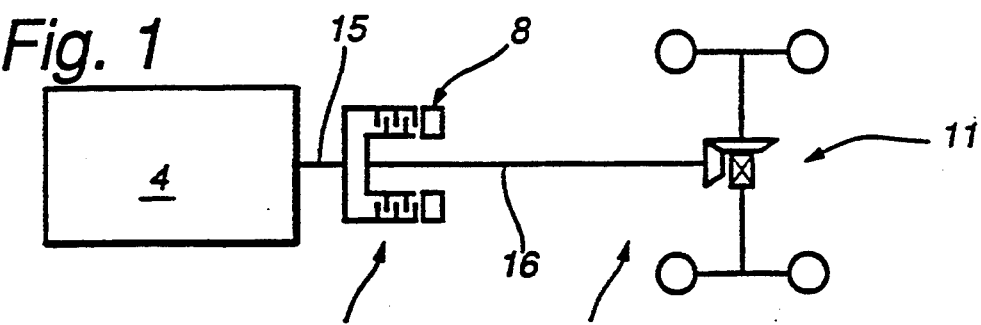
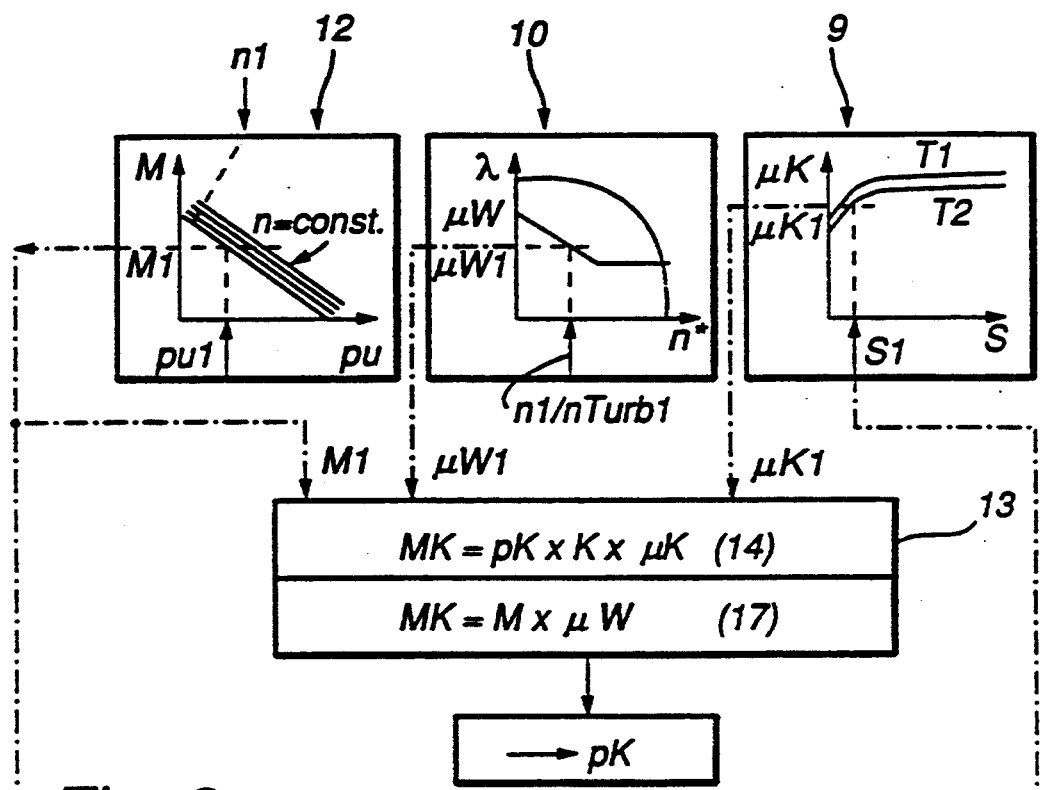
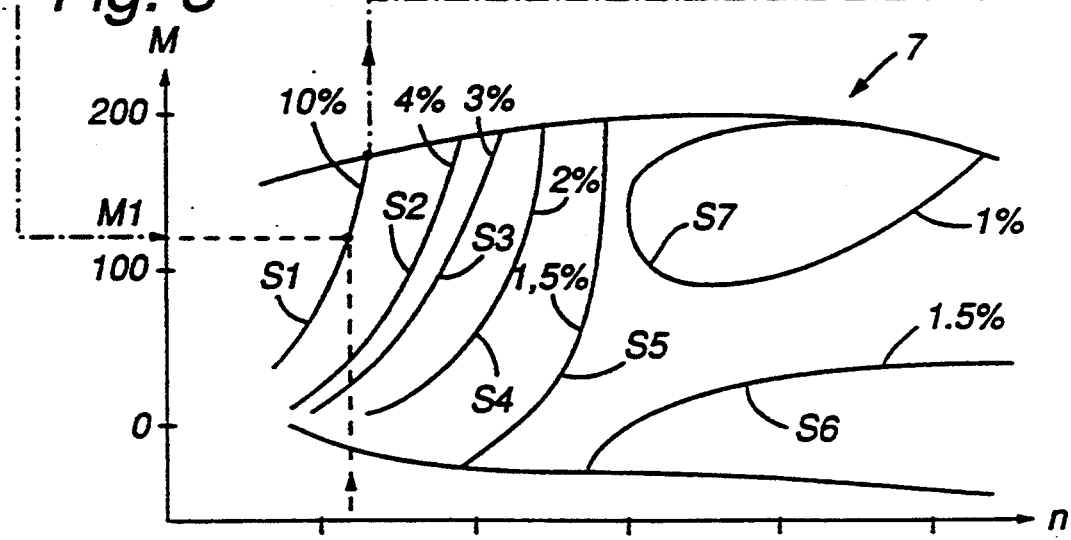

ARRANGEMENT FOR ADJUSTING THE CLUTCH SLIP OF A FRICTION CLUTCH ARRANGED ON THE OUTPUT SIDE OF A MOTOR VEHICLE ENGINE

BACKGROUND AND SUMMARY OF THE INVENTION

The invention relates to an arrangement for adjusting clutch slip and, more particularly, to an arrangement for adjusting the clutch slip of a friction clutch arranged on the output side of a motor vehicle engine. A control variable for a clutch control element which determines the clutch slip is formed through a process involving both the specifying of set point values for the clutch slip which are dependent on the torque and speed of the engine and are written into a characteristic diagram, and the recording and use of actual values for the characteristic-diagram parameters.

The cyclic irregularity of an engine gives rise to troublesome "hum" frequencies in the adjoining drive line, especially at low engine speeds. It is possible to avoid the transmission of the hum oscillation from the engine by means of the above described types of arrangements since, with a slipping clutch, the output torque is determined by the clutch torque and not by the input torque to the clutch.

German Patent Document DE 31 30 871 C2 discloses an arrangement for adjusting the clutch slip wherein the control variable is subjected, together with a determined actual value for the clutch slip, to a set point value/actual value comparison. A regulating variable, formed as a function of the deviations of the comparison, is applied to the clutch control element, i.e. the adjustment of the clutch slip is performed in a closed control loop. In order to achieve a sufficient control rate, the natural frequency of the control circuit must, however, be very high.

German Patent Document DE 39 18 254 A1 discloses a method of a different type for preventing load-change shocks due to abrupt alterations of the position of the accelerator pedal in vehicles equipped with an internal combustion engine, a gearbox and a clutch which is arranged between the internal combustion engine and the gearbox and can be controlled as regards the transmissible torque. In this known method, it is envisaged that, when the accelerator pedal is moved out of an overrun position into a load position, the clutch is automatically pressure-actuated out of a position of engagement assigned to the overrun position of the accelerator pedal. A predeterminable slip between the speed of the internal combustion engine and gearbox input results, in the direction of engagement, so as to transmit a continuously increasing torque.

Forster, "Automatische Fahrzeuggetriebe" [Automatic Transmissions for Vehicles], Springer Verlag 1991, ISBN 3-540-52228-x describes the effect of temperature on the friction coefficient of a clutch (page 236, FIG. 7.3) and the interrelationship between the parameters of a hydrodynamic torque converter (page 74, FIG. 3.24a.$b$).

German Patent Document DE 41 00 372 A1 discloses an arrangement for controlling the slip of an automatic friction clutch arranged between an engine and a manual gearbox of a motor vehicle. The arrangement comprises a positioning drive which adjusts the clutch as a function of a set point position signal to a position defined by the set point position signal. A first speed sensor records the clutch input speed. A second speed sensor records the clutch output speed. A slip-control device generates the set point position signal as a function of the instantaneous difference between the clutch input speed and clutch output speed recorded by the speed sensors, such that the instantaneous speed difference is equal to a predetermined set point speed difference.

To enable a predetermined slip to be maintained with high control accuracy both in steady-state operation and in the event of a load change, this known method operates in such a manner that the slip control device is assigned a clutch characteristic memory which stores the set point position signal in the form of a characteristic as a function of data. This represents the torque transmitted by the clutch in the set point position. The clutch characteristic memory generates the set point position signal in accordance with the value of the instantaneous engine torque determined by a torque determination device. The slip control device superimposes the set point position signal of the clutch characteristic memory on a control signal component generated by its controller.

The object on which the invention is based is essentially to achieve a rapid change in the clutch slip when the engine torque changes, for example, due to actuation of the throttle butterfly.

According to the present invention, the object is achieved in an advantageous manner by an arrangement for adjusting the clutch slip of a friction clutch arranged on the output side of a motor vehicle engine. A control variable for a clutch control element which determines the clutch slip is formed through a process involving both the specifying of set point values for the clutch slip which are dependent on the torque and speed of the engine and are written into a characteristic diagram, and the recording and use of actual values for the characteristic-diagram parameters. The control variable is applied to the clutch control element in an open control loop, irrespective of actual values of the clutch slip.

In the arrangement for adjusting the clutch slip according to the present invention, a change in the clutch torque is immediately fed-in when the engine torque changes and the system does not await a change in the clutch slip to carry out a set point value/actual value comparison. The controlled slip speed is frequency-independent.

In a further embodiment for controlling the clutch slip according to the present invention, the controlled clutch torque will bring about a clutch slip which results from the contact pressure and the characteristic for the friction coefficient of the clutch lining used.

In another embodiment for adjusting the clutch slip according to the present invention, the friction clutch does not act as the lock-up clutch of a hydrodynamic torque converter but is arranged on the output side of a hydrodynamic converter. The control of the clutch torque takes into account the fact that the torque of the friction clutch is increased relative to the torque of the engine by the conversion ratio of the torque converter.

In a further embodiment for adjusting the clutch slip according to the present invention, errors in the determination of the characteristic values or in the conversion of the result of the calculation into the control variable are detected by a slip speed monitoring facility and taken into account by correction of the characteristic-diagram values.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic block diagram showing a drive line leading from an engine to a driven vehicle axle of a motor vehicle, and having a friction clutch on the output side of the engine and a clutch control element which adjusts the clutch slip of the friction clutch;

FIG. 2 is a block diagram showing an arrangement according to the invention for adjusting the clutch slip in the friction clutch of FIG. 1; and FIG. 3 is a diagram which illustrates a characteristic diagram, in which lines of constant slip set point values, which are dependent on the torque and on the speed of the engine in FIG. 1, are plotted.

DETAILED DESCRIPTION OF THE DRAWINGS

Referring first of all to FIG. 1, the slip S of a friction clutch 6 situated in the power transmission path between an engine 4 and a driven vehicle axle 11 of a motor vehicle 5 can be adjusted by means of a clutch control element 8. The clutch control element 8 is operated with a hydraulic working pressure pK which is formed in accordance with the arrangement shown in FIGS. 2 and 3. According to this arrangement, the engine torque Ml associated with the respective operating point is read out from an engine characteristic diagram 12 on the basis of the measured actual values for the engine speed nM and the intake pressure pu of the engine 4. This allows the set point value S1 for the clutch slip S to be set associated with the operating point to be read out of the characteristic diagram 7 shown in FIG. 3, e.g. the set point value S1=10% at an engine torque Ml=160 Nm and an engine speed of nl=1, 300 rpm, i.e. the slip speed to be set is 130 rpm. Using this slip set point value S1 and a measured operating temperature T2 in the friction clutch 6, a friction coefficient $\mu Kl$ is read out of the characteristic diagram 9. The working pressure pK for the clutch control element 8 can thus be calculated in a computing stage 13 in accordance with the algorithm (14), in which MK stands for the clutch torque of the friction clutch 6 and K is a constant for the effective total frictional area of the friction clutch 6, MK being equal to the engine torque Ml if a torque converter is used and the friction clutch 6 is used in a known manner as a lock-up clutch of a hydrodynamic torque converter (not shown in Example 1). The crankshaft 15 of the engine 4 is connected both to the impeller of the torque converter and to the primary-side clutch half of the friction clutch 6. Both the turbine of the torque converter and the secondary-side clutch half of the friction clutch 6 are connected to a turbine shaft 16.

Where the friction clutch 6 is arranged on the output side of a hydrodynamic torque converter, the clutch torque MK of the friction clutch is increased by the conversion ratio $\mu W1$ at the operating point M1, nl of the engine 4 in accordance with the relation (17) in FIG. 2.

The conversion ratio $\mu W$ is read out of the characteristic diagram 10 shown in FIG. 2. The value $\mu W1$ for the operating point M1, nl of the engine 4 is obtained from the associated speed ratio $n^* = nM1/nTurbl$, in which nTurbl stands for the value, measured at the operating point, for the speed of the turbine shaft of the torque converter.

In this way, the working pressure pK of the clutch control element 8 is formed directly from measured parameter values and from characteristic-diagram data and the slip S controlled, i.e. the clutch contact pressure reacts directly to changes in the engine or turbine torque.

The essential element in the arrangement for adjusting the clutch slip S according to FIGS. 2 and 3 is the exact measurement of the parameters nM, pu and nTurb which are required for controlling the slip S. Thus, by means of the measurement of the turbine torque (or its calculation from the engine and converter parameters) and by specification of the friction-coefficient variation against the slip and the operating temperature, the working pressure pK for the clutch control element 8 is set so that the set point value for the clutch slip S is necessarily achieved.

For the correction or adaptation of one or both of the characteristic diagrams 7 and 9, use can be made of known methods, in which as a function of deviations obtained by a set point value/actual value comparison, correction factors or increments for the clutch slip S are formed and used to adapt the characteristic diagrams.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for adjusting a clutch slip of a friction clutch arranged on an output side of an engine of a motor vehicle, comprising:
    a clutch control element having a control variable, said clutch control element determining said clutch slip, said control variable being formed through a process wherein both set point values are specified for the clutch slip which are dependent on torque and speed of said engine, said set point values being written into a first characteristic diagram, and actual values are used for parameters of said first characteristic diagram; and
    an open control loop in which said control variable is applied to said clutch control element irrespective of said actual values of said clutch slip.

2. An arrangement according to claim 1, wherein a second characteristic diagram is used, wherein friction coefficient values which influence the clutch slip and are dependent on the operating temperature of the friction clutch are written into said second characteristic diagram against said set point values for the clutch slip and against the operating temperature;
    wherein in a process involving the recording and use of actual values for the operating temperature of the friction clutch, said control variable is formed as a function of said friction coefficient values.

3. An arrangement according to claim 1, wherein a third characteristic diagram is used, wherein values for a characteristic figure for a conversion ratio of a hydrodynamic torque converter are plotted against a speed ratio of the torque converter, and
    wherein in a process involving the recording and use of actual values for a speed of the turbine of the torque converter, said control variable is formed as a function of said characteristic figure for the conversion ratio.

4. An arrangement according to claim 1, further comprising:
- means for recording and using actual values for the clutch slip;
- means for a set point value/actual value comparison of the clutch slip; and
- means for adapting the first characteristic diagram for the set point values of the clutch slip in dependence on the means for the set point value/actual value comparison.

5. A process for adjusting clutch slip of a friction clutch arranged on an output side of an engine of a motor vehicle, the process comprising the steps of:
- specifying set point values for the clutch slip which are dependent upon the torque and speed of the engine;
- writing said specified set point values into a first characteristic diagram;
- record and using actual values as parameters for the first characteristic diagram;
- forming a control variable for a clutch control element which determines the clutch slip; and
- applying said control variable to the clutch control element in an open control loop, irrespective of the actual values of the clutch slip.

6. A process according to claim 5, further comprising the steps of:
- using a second characteristic diagram;
- writing into said second characteristic diagram values of a friction coefficient which influences the clutch slip and are dependent on the operating temperature of the friction clutch, said values being written against the set point values for the clutch slip and the operating temperature; and
- forming said control variable as a function of the friction coefficient in a process involving recording and use of actual values for the operating temperature of the friction clutch.

7. A process according to claim 5, further comprising the steps of:
- using a third characteristic diagram;
- plotting in said third characteristic diagram values for a characteristic figure for a conversion ratio of a hydrodynamic torque converter against a speed ratio of the torque converter; and
- forming said control variable as a function of the characteristic figure for the conversion ratio on a process involving recording and use of actual values for the speed of the turbine of the torque converter.

* * * * *